Aug. 21, 1934.  O. A. ALVRING  1,970,538
FLUID MEASURING APPARATUS
Filed Oct. 21, 1931
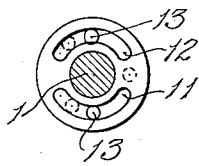
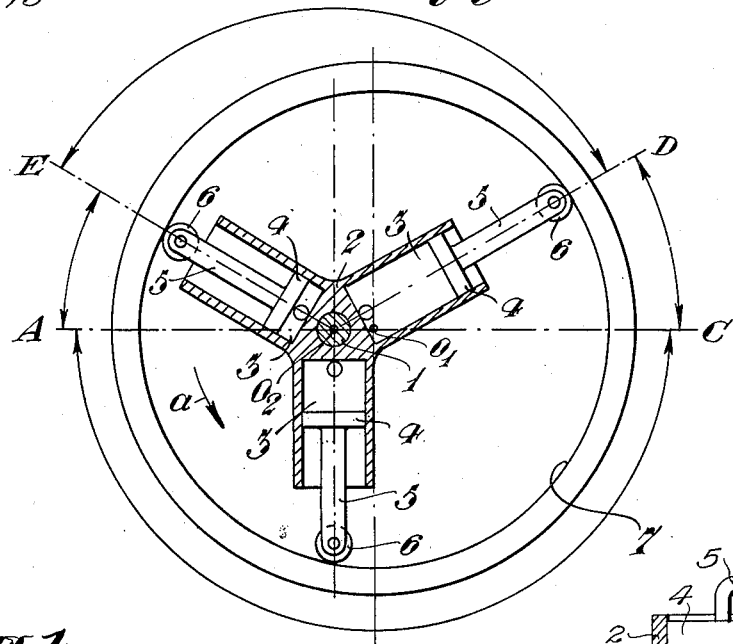
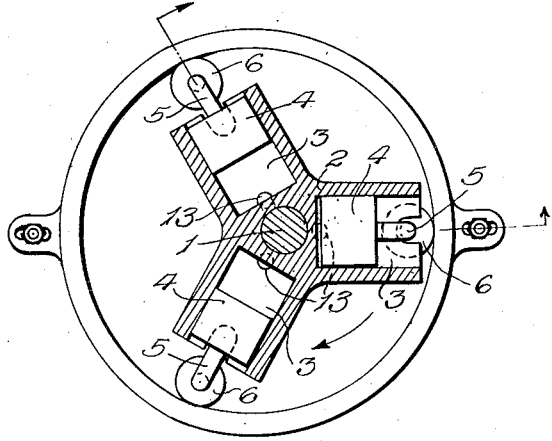
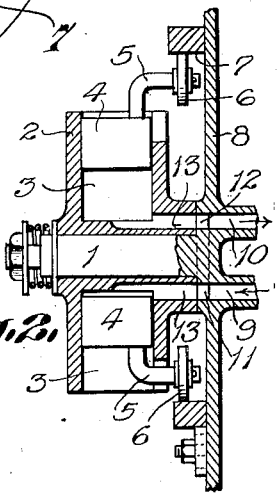
Inventor
Oscar A. Alvring
By Sommers & Young
Attys.

Patented Aug. 21, 1934

1,970,538

UNITED STATES PATENT OFFICE 1,970,538

FLUID MEASURING APPARATUS

Oscar A. Alvring, Midsommarkransen, near Stockholm, Sweden

Application October 21, 1931, Serial No. 570,244
In Sweden November 27, 1930

3 Claims. (Cl. 73—30)

This invention relates to a fluid measuring apparatus and has for its object to provide an apparatus for measuring predetermined quantities of liquid, while the latter is flowing continuously or substantially continuously through the apparatus.

Another object of the invention is to provide an apparatus of the above said kind which is of a simple structure and reliable in operation.

With these and other objects in view the measuring apparatus according to the invention comprises two main elements, rotatable relatively to each other, viz. a measuring body containing two or more measuring chambers arranged around a common centre and each containing a piston movable radially or nearly radially relatively to said centre, the other main element comprising a guide-way adapted to control said pistons which is arranged concentrically with relation to said centre in such a way that upon the relative rotation of said measuring body and said guide-way the pistons are caused due to their engagement with the guide-way to reciprocate in their respective borings, at the same time that the measuring chambers represented by said borings are alternately brought into communication with an inlet and an outlet for the liquid.

In the accompanying drawing several embodiments of the invention are illustrated by way of example. Fig. 1 is a side elevation, partly in section, of a measuring apparatus according to one embodiment. Fig. 2 is an axial section of the same measuring apparatus. Fig. 3 is a detail view of the fluid channels of said apparatus.

Fig. 4 is a side elevation, partly in section, of a second embodiment of the invention.

With reference to Figs. 1 and 2, the numeral 1 indicates a rigid journal which carries rotatably a body 2 having three cylindrical borings 3 equally distributed about the journal 1 which extend radially with relation to said journal. Slidably mounted in each boring is a piston 4 the piston rod 5 of which is angularly bent and carries at its free end a roller 6. The rollers 6 are adapted to engage the inner periphery of a circular or cylindrical guide-way 7 which is eccentric with relation to the journal 1 and may be attached to a frame 8 to which the journal 1 may be also attached. The body 2 is held by a spring in engagement with a ground surface of the frame 8 which is formed with inlet and outlet channels 9 and 10, respectively, for the liquid to be measured. Said channels end into grooves 11 and 12, respectively, see Fig. 3, which are formed as arcs of about 120° each concentric with the journal 1.

Formed in the body 2 at the same diameter as said grooves are three channels 13, one for each boring 3, which lead from their respective borings to the surface of the body 2 which bears against the frame 8.

Assuming, the body 2 and the frame 8 are caused to rotate with relation to each other, as, for instance, by rotation of the body 2 in the direction of the arrow shown in Fig. 1 about the journal 1, then each channel 13 will be in communication with the inlet 9 during a certain part of each revolution and will be in communication with the outlet 10 during another part of each revolution. Provided the liquid is admitted under pressure, then it will tend to widen the space below each piston, as long as said space communicates with the inlet. The arrangement of the guide-way 7 with relation to the journal 1 is of such a nature that during said relative rotation the pistons will be moved outwards successively, while the spaces below the pistons are in communication with the inlet 9 but will be forced inwards successively, while said spaces are in communication with the outlet 10. During each revolution of the body 2 with relation to the guide-way 7 each boring 3, as a result, will be filled with a given amount of liquid and again emptied of said liquid. The apparatus may, of course, be provided with the necessary counting registers in order to register the quantities of fluid delivered.

In the embodiment above described the shape of the guide-way 7 is assumed to be circular or cylindrical. It is evident that with such a shape of the guide-way the rotation of the measuring body will not be directly proportional to the outward movement of the pistons. Owing to this fact the apparatus described cannot measure a smaller quantity than that corresponding to the volume of an entire measuring chamber, and, as a result, such an apparatus may not be used in case it is desired to measure fractions of such a volume. It may also happen that sometimes one piston and sometimes two pistons are on the outlet side of the guide-way, whereby the uniform delivery of liquid may be affected.

In the embodiment shown in Fig. 4 the guide-way is in part of a shape deviating from the circular shape in such a way that in the relative rotation of the measuring chambers and the guide-way the rectilinear movement of the pistons within the measuring chambers under the control of said part of the guide-way will be directly proportional to the rotation.

In this embodiment the guide-way 7 is of the following shape:

From point C to point D the guiding surface comprises a circular arc having its centre in the centre $O_2$ of journal 1, from point D to point E the guiding surface comprises an Archimedean spiral, and from point E to point A the surface is again shaped as an arc having its centre in point $O_2$. From point A to point C the guiding surface comprises a circular arc having its centre in point $O_1$. Said point $O_1$ is eccentrically positioned with relation to the centre $O_2$ of the journal 1 in a degree corresponding to the eccentricity of the Archimedean spiral. In the drawing, the distance A—C includes an angle of 180°, the distance C—D an angle of 30°, the distance D—E an angle of 120°, and the distance E—A an angle of 30°. The distance D—E comprises that part of the guide-way, along which the pistons move during the delivery of liquid from the respective measuring chambers, provided the body 2 is rotating in the direction of the arrow $a$. Said distance D—E corresponds to the angular distance between two measuring chambers, because the body 2 contains three symmetrically positioned measuring chambers.

The operation is as follows:

During the rotation of the rotor 2 in the direction of the arrow $a$ liquid enters the measuring chambers, while the latter are moving from point A to point C, which points represent the shortest and the longest distance, respectively, from the guide-way 7 to the centre $O_2$. During the movement along the part C—D of the guiding surface the pistons remain in their extreme outer position, because said part of the guiding surface is concentric with the centre of rotation of the rotor 2. In point D the pistons begin to move inwards and due to the shape of the guiding surface between D and E the inward movement of the pistons takes place directly proportionally to the rotation. It is evident that, irrespective of the position in which the rotor stops during said rotation and the liquid discharged is measured, the quantity of liquid measured will be proportional to the extent of the rotation, that is to say, the quantity of liquid thus measured may be indicated by a pointer rigidly attached to the rotor or geared thereto. After the discharge of liquid from one measuring chamber is completed, that is to say, when the respective piston reaches the point E, then the movement of the piston to point A will take place without causing any movement of the piston in its respective measuring chamber, whereupon the cycle described will again begin in point A.

Because that part of the guiding surface which is formed as an Archimedean spiral corresponds to the angular distance between two pistons, then it follows that the discharge of liquid from one measuring chamber ceases in the same moment that the admission of liquid to the measuring chamber next following begins, whereby a completely continuous discharge may be secured.

What I claim is:—

1. In a liquid measuring apparatus of the type operated by the action of the liquid, supplied under pressure, the combination of a rigid frame, a non-rotary journal carried by said frame so as to project freely therefrom, a body comprising a hub and a plurality of radial arms rotatably mounted on said journal, each of said arms being formed with a cylinder chamber having their outer ends open, said frame having a ground surface surrounding said journal and inlet and outlet channels ending in said surface, the hub being formed with an end surface to engage said ground surface and with channels leading from the various cylinder chambers and ending in said end surface, pistons reciprocable in said cylinder chambers, a stationary guide-way, and means on said pistons to engage said guide-way to cause rotation of the body due to the outward movement of the pistons under the action of the liquid to be measured.

2. In a liquid measuring apparatus of the type operated by the action of the liquid, supplied under pressure, the combination of a rigid frame, a non-rotary journal carried by said frame so as to project freely therefrom, a body comprising a hub and a plurality of radial arms rotatably mounted on said journal, each of said arms being formed with a cylinder chamber having their outer ends open, said frame having a ground surface surrounding said journal and inlet and outlet channels ending in said surface by extended grooves, the hub being formed with an end surface to engage said ground surface and with channels leading from the various cylinder chambers and ending in said end surface, means to hold the body with its end surface in contact with said ground surface, pistons reciprocable in said cylinder chambers, a stationary guide-way, and means on said pistons to engage said guide-way to cause rotation of the body due to the outward movement of the pistons.

3. In a liquid measuring apparatus of the type operated by the action of the liquid, supplied under pressure, the combination of a rigid frame, a non-rotary journal carried by said frame so as to project freely therefrom, a body comprising a hub and a plurality of radial arms rotatably mounted on said journal, each of said arms being formed with a cylinder chamber having their outer ends open, said frame having a ground surface surrounding said journal and inlet and outlet channels ending in said surface, the hub being formed with an end surface to engage said ground surface and with channels leading from the various cylinder chambers and ending in said end surface, pistons reciprocable in said cylinder chamber, a closed guide-way on said frame, and means on the pistons to engage said guideway in order to effect rotation of the body due to the outward motion of the pistons under the action of the liquid to be measured, said guide-way being shaped along a part of its length corresponding to the angular distance between two cylinder chambers as an Archimedean spiral so as to effect a full stroke of the pistons at a velocity directly proportional to the speed of rotation of the body, another part of the guide-way being formed as an arc of a circle the centre of which is eccentrically positioned with relation to the axis of the journal in a degree corresponding to the eccentricity of the Archimedean spiral, said two parts being connected by portions shaped as arcs of circles having a common centre upon the axis of the journal.

OSCAR A. ALVRING.